(12) United States Patent
Griffin et al.

(10) Patent No.: US 10,742,745 B2
(45) Date of Patent: Aug. 11, 2020

(54) METHODS AND APPARATUS FOR MANAGING NOTIFICATIONS FOR SERVICE EVENTS

(71) Applicant: BlackBerry Limited, Waterloo (CA)

(72) Inventors: Chris Michael Griffin, Naperville, IL (US); David Jaray Hanson, Maple Valley, WA (US); Philip Von Hatten, Kitchener (CA); Michael Rao, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/415,008

(22) Filed: Jan. 25, 2017

(65) Prior Publication Data
US 2017/0134502 A1    May 11, 2017

Related U.S. Application Data

(63) Continuation of application No. 12/855,972, filed on Aug. 13, 2010, now Pat. No. 9,571,574.

(51) Int. Cl.
*H04L 29/08* (2006.01)
*H04W 88/02* (2009.01)

(52) U.S. Cl.
CPC ............. *H04L 67/14* (2013.01); *H04L 67/02* (2013.01); *H04L 67/1095* (2013.01);
(Continued)

(58) Field of Classification Search
CPC . H04L 12/5895; H04L 69/329; H04L 45/306; H04M 2203/4536; H04M 2207/18; H04W 92/02
See application file for complete search history.

(56) References Cited

U.S. PATENT DOCUMENTS

| 6,745,193 B1 | 6/2004 | Horvitz et al. |
| 7,761,522 B2 | 7/2010 | Shenfield et al. |

(Continued)

FOREIGN PATENT DOCUMENTS

| EP | 1271320 | 1/2003 |
| JP | 2006330816 | 12/2006 |

OTHER PUBLICATIONS

Huang, Y., et al., "A Comparative Study of Web Services-based Event Notification Specifications", Department of Computer Science, Indiana University, Proceedings of the 2006 International Conference on Parallel Processing, Aug. 14-18, 2006, http://www.cs.indiana.edu/~yihuan/research/yhuang-comparativeStudy.pdf, pp. 1-8.

(Continued)

*Primary Examiner* — Philip J Chea
*Assistant Examiner* — Mohammed Ahmed
(74) *Attorney, Agent, or Firm* — Donna Flores; Fleit Intellectual Property Law

(57) ABSTRACT

The communications method may include opening a communication channel, e.g. a HyperText Transfer Protocol Secure (HTTPS) connection, between a service event source and an event management platform, and at the event management platform, generating a request to the service event source, the request including information associated with the communication channel and requested event information related to a plurality of services offered by the service event source for a mobile wireless device associated with a given service user; sending the request to the service event source. The communication channel is maintained open to receive notifications transmitted from the service event source including requested event information related to the plurality of services offered by the service event source and related to the single service user. The notifications are provided to the (Continued)

mobile wireless device associated with the given service user.

17 Claims, 8 Drawing Sheets

(52) U.S. Cl.
 CPC .......... *H04L 67/26* (2013.01); *H04L 67/2838* (2013.01); *H04W 88/02* (2013.01)

(56) References Cited

U.S. PATENT DOCUMENTS

| | | | |
|---|---|---|---|
| 2002/0133541 A1* | 9/2002 | Sturtevant | H04L 29/06 709/203 |
| 2003/0004917 A1 | 1/2003 | Thomas et al. | |
| 2003/0050046 A1* | 3/2003 | Conneely | H04L 12/587 455/412.1 |
| 2004/0076155 A1 | 4/2004 | Yajnik et al. | |
| 2004/0225693 A1 | 11/2004 | Ganji et al. | |
| 2006/0069702 A1* | 3/2006 | Moeller | G06F 9/542 |
| 2006/0224750 A1 | 10/2006 | Davies et al. | |
| 2006/0253567 A1 | 11/2006 | Selin et al. | |
| 2007/0027921 A1 | 2/2007 | Alvarado et al. | |
| 2007/0088790 A1 | 4/2007 | Shenfield et al. | |
| 2007/0118599 A1 | 5/2007 | Castanho et al. | |
| 2007/0143502 A1 | 6/2007 | Garcia-Martin et al. | |
| 2007/0190978 A1 | 8/2007 | White et al. | |
| 2007/0208803 A1 | 9/2007 | Levi et al. | |
| 2008/0005188 A1 | 1/2008 | Li et al. | |
| 2008/0059656 A1 | 3/2008 | Saliba et al. | |
| 2009/0012841 A1* | 1/2009 | Saft | G06Q 30/02 705/7.29 |
| 2009/0254601 A1* | 10/2009 | Moeller | G06F 9/542 709/201 |
| 2009/0298474 A1* | 12/2009 | George | G10L 13/00 455/412.2 |
| 2010/0159887 A1 | 6/2010 | Lewis | |
| 2010/0250695 A1 | 9/2010 | Shenfield et al. | |

OTHER PUBLICATIONS

Etzkorn, L., et al., "CORBA's Notification Service", Sep. 16, 2002, http://www.eetimes.com, pp. 1-8.

Saint-Andre, P., et al., "AtomSub: Transporting Atom Notifications over the Publish-Subscribe Extension to the Extensible Messaging and Presence Protocol (XMPP)", May 7, 2008, pp. 1-12.

Open Mobile Alliance, Ltd., "Dynamic Content Delivery Technical Specification-Semantics and Transactions", Candidate Version 1.0—Dec. 23, 2008, pp. 1-215.

Extended European Search Report, dated Feb. 16, 2011, received for European Application No. 10172845.9.

Canadian Office Action dated Apr. 3, 2013, received for Canadian Office Action 2,712,956.

Canadian Office Action dated Jun. 13, 2012, received for Canadian Office Action 2,712,956.

Canadian Office Action dated Nov. 29, 2013, received for Canadian Office Action 2,712,954.

Canadian Office Action dated Feb. 21, 2013, received for Canadian Office Action 2,712,954.

* cited by examiner

METHODS AND APPARATUS FOR MANAGING NOTIFICATIONS FOR SERVICE EVENTS

RELATED APPLICATION

This application claims priority to provisional application Ser. No. 61/234,220 filed Aug. 14, 2009, and to application Ser. No. 12/855,972 filed Aug. 13, 2010, the entire disclosure of both of which is incorporated herein by reference.

TECHNICAL FIELD

The present disclosure relates generally to managing notifications and events from a service event source. More particularly, disclosed herein are methods and apparatus for managing and receiving by an event management platform notifications for events from a service event source, such as for example recent communications and personal information management updates, e.g., for a user account offered by a service provider.

BACKGROUND

Communications services (such as electronic mail (email), instant messaging, text messaging), personal information management services (such as address book and calendar), information feeding services (such as RSS and other news feeds) and social networking services (such as Facebook, MySpace and Twitter), have become an integral part of business and personal communications. Many users have multiple email and other service accounts for business and personal use. With the increased availability of mobile devices that can send and receive email and access other applications using wireless networks, many users wirelessly access email and other services from a variety of sources, including generic or standards-based e-mail servers such as IMAP or POPS mail servers, servers for corporate email, "groupware", or collaboration systems such as MICROSOFT EXCHANGE, LOTUS NOTES, and NOVELL GROUPWISE, and servers for proprietary email and application services such as GMAIL, GOOGLE APPS, YAHOO!, HOTMAIL, AOL, etc. Yet, distribution and synchronization of email and service updates across multiple mailboxes and over wireless networks can be challenging, particularly when this is done on a large scale for numerous service consumers.

DETAILED DESCRIPTION

Figure 1:
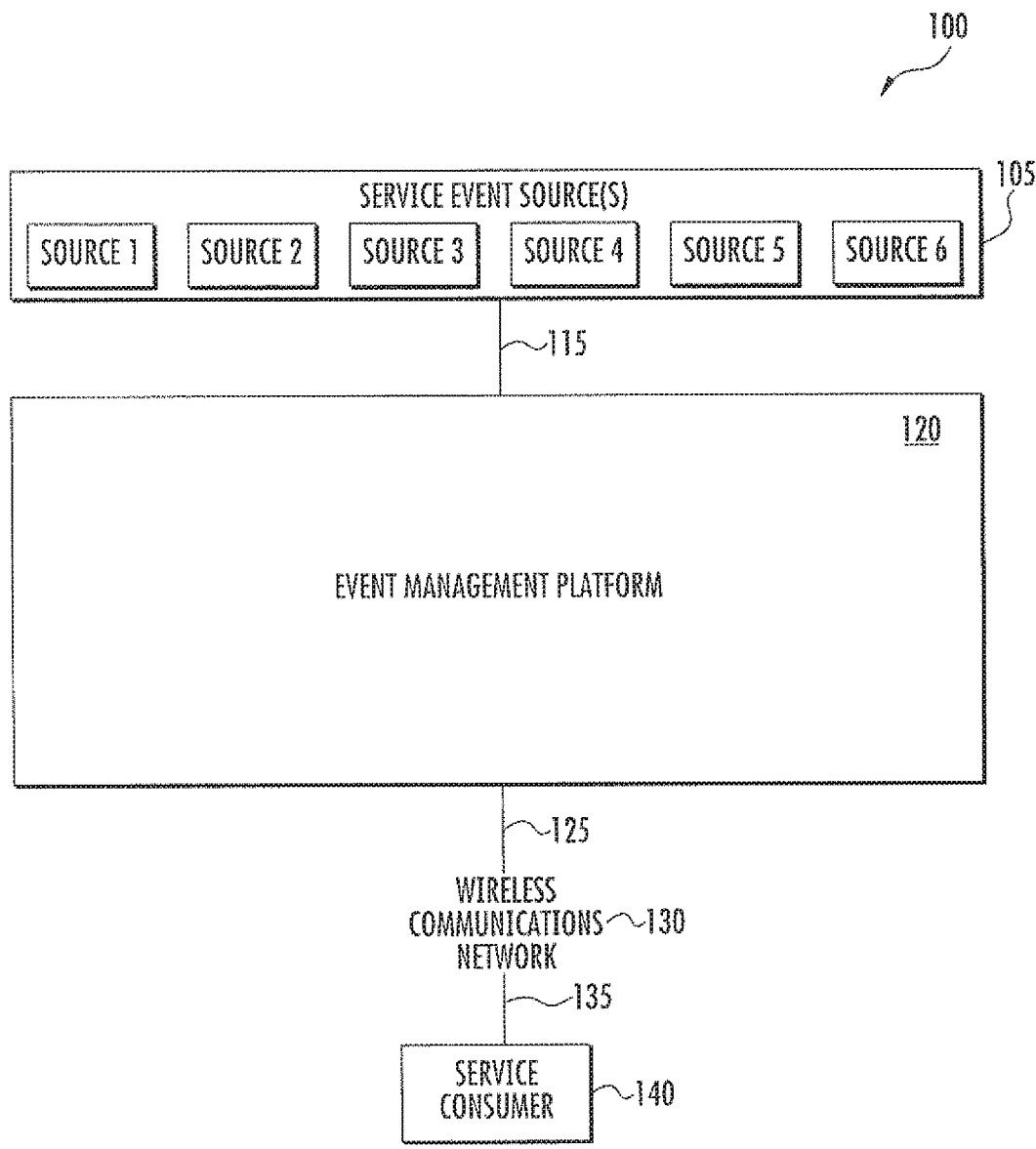
FIG. 1 is a schematic block diagram illustrating an example embodiment of an event management network including an event management platform.

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

According to aspects of the present disclosure, an event management platform may intermediate to receive, manage, and disburse event information, including notifications, from service event sources to service consumers. A service event source may include, for example, an e-mail server, a groupware or collaboration system, or a proprietary email or application server or service. An event may include the addition, change, update, or removal of information managed by the service event source, or groupings thereof, or changes to the service itself or user accounts therewith. A notification may include advising a service consumer of the occurrence of an event, and may also include advising the service consumer of content or other information related to the event (i.e., a notification need not be limited to advice that the event has occurred).

As non-limiting, typical examples, service event source may be an email system, an event may be the arrival of a new email message at the email system, a service consumer may be an email application running on a mobile communications device configured for wireless network access, and an event notification may be a message indicating the aforementioned arrival of the new email message, optionally including some metadata describing the message or some of the contents of the message; the notification is processed by the event management platform, and at least a derivative of the notification is forwarded to the email application on the mobile communications device so that it may take appropriate action. This is merely an example; the aforementioned components may take various other forms in other embodiments. For just one example of an alternative embodiment, the service event source could be the email application on a mobile communications device, and the service consumer could be an email system associated with the device or its user.

The event management platform includes an event manager component, an event manager consumer interface, a database, and an event notification subscriber interface which operate in concert to provide the functions of the event management platform. A provisioning system optionally may be part of the event management platform or may be associated therewith.

The event management platform may authenticate a communication channel with the service event source. In an example embodiment, HTTP Basic Authentication is used over SSL.

The event management platform may discover instances of services at the service event source which are available for notifications. At various times, the event management platform may send to a service event source a request for the identities of the instances of a service type that are available for notifications. This request may be used to identify specific instances of services so that subscriptions are only sent in connection with those instances for which notifications are desired. A method for discovering instances of a service type that are available for notifications includes preparing and sending a request to the service event source, including requested identification information associated with a plurality of services consumed by a single user.

The event management platform may present to the service event source requests to subscribe to notifications. During the notification setup process for a user, one or more subscription requests can be sent from the event management platform to a service event source indicating that notifications should be sent to the event management platform for certain events related to the associated service.

The event management platform may then present to the event management platform a notification request indicating that an event has occurred. A service event source can generate a notification request to the event management platform when any of the events occur for the users' subscribed service instances. A method for presenting a notification to the event management platform includes preparing and sending a notification including notice of an event related to a service offered by the service event source and a description of the event. The description of the event may include data changes and other information related to the event in addition to notice of the occurrence of the event.

The event management platform may present to the service event source a request to "unsubscribe" to notifications. When the notifications on a user account are no longer desired for a service instance (e.g. the account is removed), an unsubscribe request can be sent from the event management platform to a service event source with the id of the subscription that should be deleted. The event management platform may present to the service event source a "get information" request seeking information regarding the subscriptions of a user.

A method for requesting service event related communications from a service event source may include opening a communication channel, preparing a request to the service event source, the request including information associated with the communication channel and requested event information related to a plurality of services offered by the service event source and related to a single user consuming the services, and sending the request to the service event source. A further method for requesting service event related communications from a service event source may include similar steps directed to opening a communication channel; a service offered by the service event source and related to a plurality of users consuming the service. A further method for requesting service account information from a service event source may include preparing a request to the service event source, the request including requested identification information associated with a plurality of services consumed by a single user, and sending the request to the service event source. A further method for requesting service event related communications from a service event source may include preparing a request to the service event source, the request including requested event information related to a domain hosted by the service event source and sending the request to the service event source.

This and other objects, advantages and features in accordance with the present invention may be provided by a communications method comprising: opening a communication channel between a service event source and an event management platform; at the event management platform, generating a request to the service event source, the request including information associated with the communication channel and requested event information related to a plurality of services offered by the service event source for a mobile wireless device associated with a given service user; sending the request to the service event source; maintaining the communication channel open to receive notifications transmitted from the service event source including requested event information related to the plurality of services offered by the service event source and related to the single service user; and providing the notifications to the mobile wireless device associated with the given service user.

The communications channel may be a HyperText Transfer Protocol Secure (HTTPS) connection, a pull channel, a synchronous communication channel and/or a network socket. The service event source may be an email server. The requested event information may be a subscription request, and the information associated with the communication channel may be a subscription channel ID.

Also, a communication method may include: opening a communication channel between a service event source and an event management platform; at the event management platform, generating a request to the service event source, the request including information associated with the communication channel and requested event information related to a service offered by the service event source for a mobile wireless device associated with a given service user; sending the request to the service event source; maintaining the communication channel open to receive notifications transmitted from the service event source including requested event information related to the service offered by the service event source and related to the plurality of service users; and providing the notifications to the mobile wireless device associated with the given service user.

Objects, advantages and features in accordance with the present invention may be provided by an event management platform for managing communications between at least one service event source and a mobile wireless device associated with a given service user, the event management platform comprising: an event notification subscriber interface being configured to send a request to the service event source, the request including information associated with a communication channel and requested event information related to a plurality of services offered by the service event source for the mobile wireless device associated with the given service user; and an event manager being configured to open a communication channel to the at least one service event source, and maintain the communication channel open to receive notifications transmitted from the service event source including requested event information related to the service offered by the service event source for the mobile wireless device associated with the given service user.

Also, the event management platform may include: an event notification subscriber interface being configured to send a request to the service event source, the request including information associated with a communication channel and requested event information related to a service offered by the service event source for the mobile wireless devices associated with the plurality of service users; and an event manager being configured to open a communication channel to the at least one service event source, and maintain the communication channel open to receive notifications transmitted from the service event source including requested event information related to the service offered by the service event source for the mobile wireless devices associated with the plurality of service user.

FIG. 1 illustrates an example embodiment of an event management network 100, constructed according to an aspect of the present disclosure. The event management network 100 includes at least one service event source 105 connected to an event management platform 120 (through connection 115). The event management platform 120 is connected to a wireless communications network 130 (through connection 125) and the wireless communications network is connected to at least one service consumer 140 (though connection 135). Although FIG. 1 illustrates multiple service event sources 105, an example embodiment may include one service event source, while another example embodiment may include multiple service event sources. Furthermore, although FIG. 1 illustrates only one service consumer 140, an example embodiment may include one service consumer, while another example embodiment may include multiple service consumers.

Event management network 100 allows a service consumer 140, such as a wireless communications device, to receive data associated with an event of a particular service, from a service event source 105. The term "service" as used herein is intended broadly to refer to any sort of information service or application that may be offered by an information processing device, service provider, network, or the like, any of which may be considered a "service event source", in connection with which service it may be useful to inform or notify event management platform 120 of an event or change in information associated with the service or in the service itself.

The event management platform can deliver data related to the event to the service consumer, which may be done in a synchronization one event at a time or for a group of events. Service event sources as used herein may include without limitation: generic or standards-based e-mail servers such as IMAP or POPS mail servers, servers for corporate email, "groupware", or collaboration systems such as MICROSOFT EXCHANGE, LOTUS NOTES, and NOVELL GROUPWISE, and servers for proprietary email and application services such as GMAIL, GOOGLE APPS, YAHOO!, HOTMAIL, AOL, etc. Services may include without limitation: communications services (such as electronic mail (email), instant messaging, text messaging, personal information management services (such as address book, task, or calendar management), information feed or syndication services (such as RSS, Usenet, and other news feeds) and social networking services (such as Facebook, MySpace and Twitter). An event may include without limitation any addition, update, modification, deletion, or other change, with respect to the content or information managed by any of these services, or with respect to the services themselves.

A notification may include, without limitation, advising the event management platform of the occurrence of an event, and may optionally include advising the event management platform of the actual added, updated, modified, deleted, or otherwise changed information, or some portion thereof, by any means or mechanism. The event management platform may then deliver data related to the event to the service consumer.

Examples of events may include and without limitation: Add (an item was added to the service instance); Update (a specific item was updated in the service instance); Remove (an item was removed from the service instance); readStatusChange (the read/unread status for an item has changed); repliedStatusChange (the replied status for an item has changed); presenceChange (the presence status for a contact entry has changed); attachmentAdd (an attachment has been added to an item); attachmentRemove (an attachment has been removed from an item); attachmentUpdate (an update has occurred to an attachment on an item); metaDataUpdate (metadata for an item has changed.); associateCategory (a category association has been added to an item); disassociateCategory (a category association has been removed from an item); categoryCreate (a new category has been added to the category list); categoryRemove (a category has been removed from the category list); categoryRename (a category name has been changed); serviceInstanceUpdate (some update has been made to the service instance. E.g. credentials have changed.); serviceSuspend (the service is suspended for a period of time); other (catchall event type).

In general operation, the service consumer 140 can receive data related to events which are produced in or arise from the service event source 105, and which are managed by the event management platform 120. Event management platform 120 can be any appropriate computer system, server, or other hardware or software components in any combination, capable of managing events, as known to those skilled in the art. Through event management platform 120, data related to events from a service event source 105 may be pushed to, pulled from, or otherwise delivered to service consumer 140. This may occur in a synchronization between the event management platform 120 and service consumer 140, in an example embodiment. Service event source 105, event management platform 120 and service consumer 140 need not be located at the same location. Furthermore, the event management platform 120 and service consumer 140 may be combined, in an example embodiment.

Figure 2:
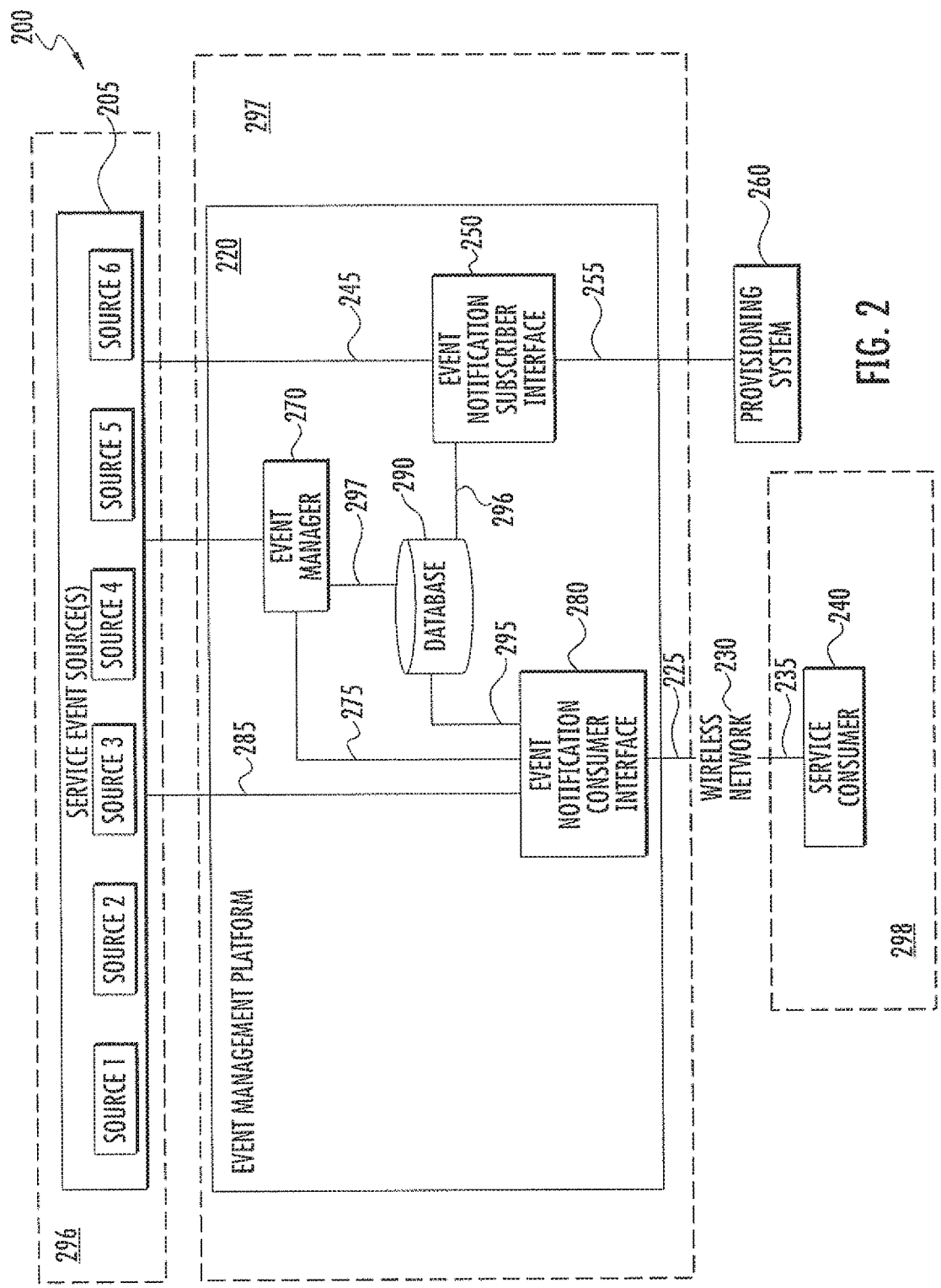
FIG. 2 is a schematic block diagram illustrating further details of an example embodiment of an event management network including an event management platform.

FIG. 2 illustrates an example embodiment of an event management network 200, according to a further aspect of the present disclosure. The event management network 200 includes at least one service event source 205 connected to an event management platform 220 (e.g., through connections 245, 265 or 285). The event management platform 220 is connected to a wireless communications network 230 (through connection 225) and the wireless communications network is connected to at least one service consumer 240 (though connection 235). Although FIG. 2 illustrates multiple service event sources 205, an example embodiment may include one service event source, while another example embodiment may include multiple event sources. Furthermore, although FIG. 2 illustrates only one service consumer 240, an example embodiment may include one service consumer, while another example embodiment may include multiple service consumers.

The event management platform 220 includes an event notification subscriber interface 250, an event manager 270, an event notification consumer interface 280 and a database 290. The database 290 is connected to event manager 270 (through connection 297), the event notification subscriber interface 250 (through connection 296), the event notification consumer interface 280 (through connection 295). The event notification subscriber interface 250 is connected to service event source 205 (through connection 245) and to a provisioning system 260 (through connection 255). The event manager 270 is connected to service event source 205 (through connection 265) and the event notification consumer interface 280 (through connection 275). The event notification consumer interface 280 is connected to service event source 205 (through connection 285), the database 290 (through connection 295) and to the wireless network 230 (through connection 225). Event management network 200 allows a service consumer 240, such as a wireless communications device, to receive events on services from a service event source 205.

In general operation, the service consumer 240 may subscribe to certain events which are produced in or arise from the service event source 205, and which are managed by the event management platform 220. Service event source 205 can be any suitable server (or collection thereof), or any service or service provider which furnishes an application or service in connection with which related events may be useful or relevant to the service consumer 240. Service event source 205 may, for example but without limitation, include any one or more of a generic or standards-based e-mail server such as an IMAP or POPS mail server, server for corporate email, "groupware", or collaboration systems such as MICROSOFT EXCHANGE, LOTUS NOTES, and NOVELL GROUPWISE, and proprietary email and application services such as Gmail, Google Apps, Yahoo, Hotmail, GMAIL, GOOGLE APPS, YAHOO!, HOTMAIL, AOL, and the like. Event management platform 220 can be any appropriate computer system, server, or other hardware or software components in any combination, capable of managing events, as known to those skilled in the art.

Through event management platform 220, events from a service event source 205 may be pushed to, pulled from, or otherwise delivered to service consumer 240. This may occur in a synchronization between the event management platform 120 and service consumer 140, in an example embodiment. Service event source 205, event management platform 220 and service consumer 240 need not be located at the same location. Furthermore, the event management platform 120 and service consumer 140 may be combined, in an example embodiment.

Communication between the event management platform 220 and a service event source 205 may occur over any appropriate communications channel. In an example embodiment, a secure communications channel may be used, such as for example and without limitation, a channel employing the HTTPS (Hypertext Transfer Protocol Secure) protocol. Other example embodiments are: a synchronous communications channel, a firewall-friendly communications channel, and a socket.

In example embodiments, database 290 may be any suitable database server (such as a server running the ORACLE, DB2, or MySQL database management system software, as non-limiting examples). Event manager 270 may be a servlet inside a web sever (such as an Apache web server, as a non-limiting example), event notification subscriber interface may be a server (such as a SOAP server, as a non-limiting example), and event notification consumer interface may be a server (such as a proxy server, as a non-limiting example).

Furthermore, any and all of service event sources 105 and 205, event management platform 120 and 220, event notification subscriber interface 250, event manager 270, event notification consumer interface 280, and database 290 may be realized using one or more suitable programmable computer systems running a commercially available operating system. For example, these items may be realized using commercial server computers having INTEL IA-32- or IA-64-based processors and running an operating system in the MICROSOFT WINDOWS Server family. Other computers and operating systems could also be used. Further, in some cases, some elements may be implemented using special purpose hardware or systems. For example, database 290 could be realized using a special-purpose computer or other digital system having functions optimized for or limited to providing a database service. Although some of elements 105, 205, 120, 220, 250, 270, 280, and 290 are depicted as distinct elements and may be realized as such (i.e., using separate server computers), skilled artisans will appreciate that these elements may be refactored or virtualized as necessary to meet expected load. Thus, these elements could also be realized as any number of different processes, tasks, threads, or other operating-system-defined entities running on the same computer or on several computers.

In various example embodiments, control of or operational responsibility for principal elements of FIG. 2 may be distributed among several different entities. For example, as best seen in FIG. 2, there is depicted an example configuration of control or operational responsibility defined by three rectangular zones shown in broken lines. In an example embodiment, a first zone 296 includes the service event sources 205, which may, for non-limiting example, be under the control of or operated by an internet service provider (ISP), an application service provider (ASP) (such as a commercial e-mail service), or a similar entity. A second zone 297 includes the event management platform 220, and optionally the provisioning system 260, and may, for non-limiting example, be under the control of or operated by a different internet service provider or application service provider. Second zone 297 could also be under the control of or operated by a provider of supplemental services designed to enhance the operation of wireless mobile communications devices, which services could include, for non-limiting examples, management of synchronization of PIM information between such devices and the services of ISP, ASP, or similar entities, in addition to management of event notifications as described in the present disclosure. A third zone 298 includes the service consumer 240, and, for non-limiting example, may be operated by or under the control of the end user of a wireless mobile communications device.

In a further example embodiment configured as depicted in FIG. 2, the first zone 296 may be under control of or operated by an ISP, ASP, or commercial e-mail service, as previously described. The second zone 297 may be under control of or operated by an enterprise, such as a business, non-profit organization, or government entity, and the event management platform 220 could be operated as part of such entity's enterprise network. The third zone 298 may be operated by or under the control of the end user of a wireless mobile communications device, as previously described.

Figure 6:
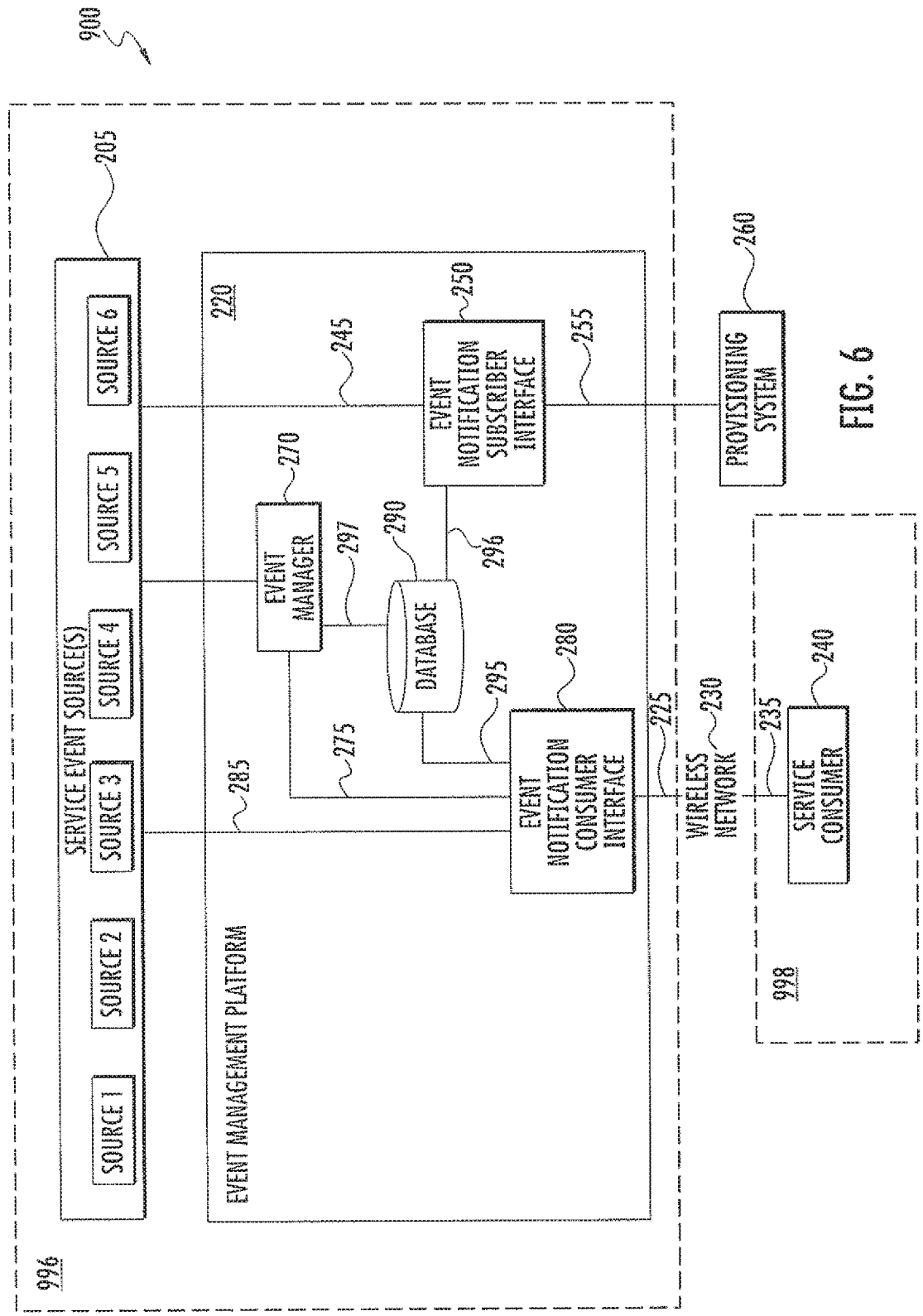
FIG. 6 is a schematic block diagram illustrating another example embodiment of an event management network including an event management platform

FIG. 6 is a block diagram of another example embodiment of an event management system 900 constructed according to an aspect of the present disclosure. The event management system 900 is similar to and contains the same elements as the event management network 200 of FIG. 2, but FIG. 6 depicts a different example configuration of control or responsibility defined by two rectangular zones shown in broken lines. In an example embodiment, a first zone 996 includes both the service event sources 205 and the event management platform 220, which may, for non-limiting example, be under the control of or operated by an internet service provider (ISP), an application service provider (ASP) (such as a commercial e-mail service), or a similar entity. First zone 996 could also be under the control of or operated by an enterprise, such as a business, non-profit organization, or government entity, and the service event sources 205 and the event management platform 220 could both be operated as part of such entity's enterprise network. A second zone 998 includes the service consumer 240, and, for non-limiting example, may be operated by or under the control of the end user of a wireless mobile communications device.

Notification Channels

According to a further aspect of the present disclosure, a notification channel is a communication link between a service event source (such as 105 of FIG. 1 or 205 of FIG. 2) and an event management platform (such as 120 of FIG. 1 or 220 of FIG. 2) that carries notifications to and from the service event source and event management platform. There may be two types of channels supported: pull and push.

A pull channel is initiated by the event management platform to the service event source in the form of an HTTPS request that is not immediately closed. Upon receiving the request, the service event source will occasionally transmit notifications, as events arise or as notifications are otherwise generated by the service event source, to the event management platform over the open HTTPS session. If this channel is closed by the service event source, the event management platform will reinitiate the connection. Multiple subscription channels may be transmitted over a single HTTPS session.

Referring FIG. 2, a subscription request and a pull channel initiation may be performed as follows, in an example embodiment. The event notification subscriber interface 250 can send a subscription request to a service event source 205 with a subscription channel ID, which can identify one or more service instances in which notifications are desired. The service event source 205 responds to the event notification subscriber interface 250 with a subscription ID. In initiating the pull channel, the event notification consumer interface 280 may send a communication to the event manager 270 to start receiving notifications from a service event source 205. The event manager 270 can open the communication channel and send a notification registration request (which may include the subscription channel ID) to the service event source 205. While this communication channel remains open the service event source 205 can send notification messages for the subscription channel ID. The communication channel can remain open until either the event manager 270 or the service event source 205 closes it.

Figure 3:
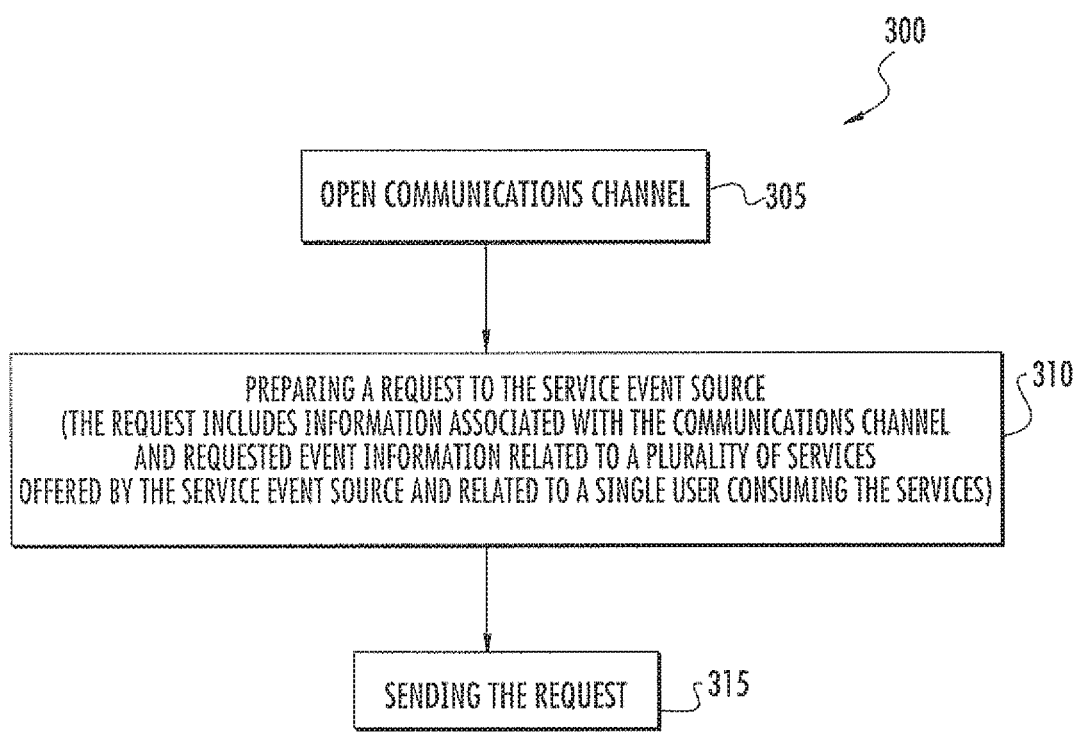
FIGS. 3 and 4 are flowcharts illustrating example embodiments or portions thereof of example embodiments of communication methods.

In accord with a further aspect of the present disclosure, FIG. 3 is a flow diagram illustrating an example embodiment of a method 300 in which a pull channel is used to request notifications related to a plurality of services offered by the service event source and related to a single user consuming the service. Referring to FIG. 3, at 305, a communications channel is opened. At 310, a request to the service event source is prepared, the request including information associated with the a communications channel and requested event information related to a plurality of services offered by the service event source and related to a single user consuming the services. At 305, the request is sent. In an example embodiment, the information associated with the communications channel is information which identifies the channel, such as a channel ID. The steps of method 300 may, for example, be implemented by event manager 270.

Figure 4:
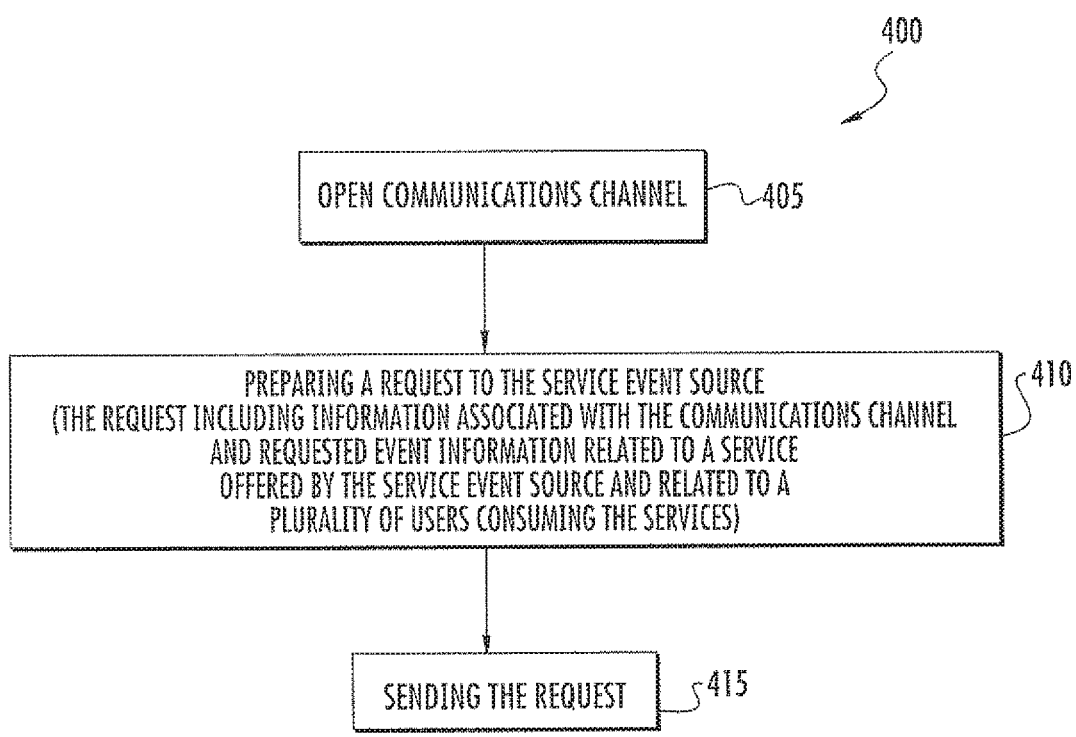

In accord with a further aspect of the present disclosure, FIG. 4 is a flow diagram illustrating an example embodiment of a method 400 in which a pull channel is used to request notifications related to a service offered by the service event source and related to a plurality of users consuming the service. Referring to FIG. 4, at 405, a communications channel is opened. At 410, a request to the service event source is prepared, the request including information associated with the communications channel and requested event information related to a service offered by the service event source and related to a plurality of users consuming the service. At 405, the request is sent. In an example embodiment, the information associated with the communications channel is information which identifies the channel, such as channel ID. The steps of method 400 may, for example, be implemented by event manager 270.

A push channel is initiated by the service event source. As notifications are generated, the service event source will transmit those notifications to the event management platform by first opening a communications channel (such as by connecting to a service addressed by a URL (Uniform Resource Locator)). This connection is very short lived as it is closed after each notification message.

Referring FIG. 2, a subscription request and a push channel initiation may be performed as follows, in an example embodiment. The event notification subscriber interface 250 can send a subscription request to a service event source 205 with a notifyURL and optionally, a subscription channel ID, which can identify one or more service instances in which notifications are desired. When an event occurs on one of those service instances, the service event source 205 opens a communications channel and sends notification messages to the event manager 270. The communications channel may be closed after each notification message.

The present disclosure addresses various aspects of managing the events by an event management platform 120, arising from a service event source 105 and subscribed to by service consumer 140.

Authentication

According to a further aspect of the present disclosure, there is provided means to authenticate a communication channel. In an example embodiment, HTTP Basic Authentication is used over SSL. The credentials used are domain specific and will be negotiated between the event management platform (such as 120 of FIG. 1 or 220 of FIG. 2) and the service event source (such as 105 of FIG. 1 or 205 of FIG. 2).

In an example embodiment, negotiation may be conducted as follows:

```
POST <subscription-url> HTTP/1.1
Authorization: Basic
QWxhZGRpbjpvcGVuIHNlc2FtZQ==
```

In this example, the username and password are transmitted as concatenated strings separated by ':' and encoded using BASE64 encoding. In other example embodiments other authentication methods may be used, such as MD5, digest, token based authentication.

Discovery Request (Event Management Platform→Service Event Source)

According to an aspect of the present disclosure, there is provided an approach to discover instances of services which are available for notifications. At various times, the event management platform 120 may send to a service event source 105 a request for the identities of the instances of a service type that are available for notifications. This request may be used to identify specific instances of services so that subscriptions are only sent in connection with those instances for which notifications are desired. An instance of a service can be defined as a single service for a single user. For example, a user's single email account is one service instance. In another example, a user's three email accounts are three service instances.

An example of desired notifications is as follows: a user may have multiple address books (e.g., separate address books for work and personal use) and may desire notifications on some instances and not on others. A discovery request can be sent from the event management platform (such as 120 of FIG. 1 or 220 of FIG. 2) to a service event source (such as 105 of FIG. 1 or 205 of FIG. 2) to request the identified instances of a service type that are available for notifications. This is useful when multiple instances of services are available and notifications are desired for some but not all of those instances.

Referring to FIG. 2, a discovery request may be performed by an example embodiment as follows. Provisioning system 260 sends a discovery request communication to event notification subscriber interface 250, which then sends a discovery request communication to a service event source 205. The service event source 205 responds to the discovery request from the event notification subscriber interface 250 with the instances of a service type that are available for notifications and the event notification subscriber interface 250 forwards this information to the database 290.

The response may contain the UIDs and some meta-data regarding the service instances in an example embodiment. This message need not necessarily be associated with a Subscription Request as the user may not desire notifications on any of the service instances.

In an example embodiment communications may be conducted as follows:

```
POST <subscription-url> HTTP/1.1
<?xml version="1.0"?>
<request xmlns:s="urn:uuid:0425d6db-060f-4576-
b083-3386ce7bb984:"
    ts="timestamp" >
<s:discover >
    <s:serviceDiscover
        s:userId="efudd@lt.com"
        s:serviceType="email"/>
    </s:discover>
</request>
```

Subscription-url identifies the service event source's subscription interface. This URL is configurable on the event management platform's end such that URL changes can be accommodated. xmlns identifies the namespace which is defined as a uuid. ts is a Timestamp in UTC dateTime when the request was generated. userId is the account's user id. serviceType (optional) identifies the type of service that the request is concerned with (e.g. email, calendar, contacts, im, socialNetworking or other). When absent, all service instances associated with the userId are requested.

In an example embodiment, the response to the discovery request may take the form:

```
HTTP/1.1 200 OK
<?xml version="1.0"?>
<s:response xmlns:s="urn:uuid:0425d6db-060f-
4576-b083-3386ce7bb984:"
    retCode="returnCode" message="message"/>
<s:discover >
    <s:servicediscoverresponse>
        <s:service
            s:userId="efudd@lt.com"
            s:serviceType="email"
s:serviceInstanceUID="392393"
            s:serviceProtocol="imap"
            s:name="inbox"
            s:location="inbox\home"/>
        </s:servicediscoverresponse>
    </s:discover>
</s:response>
``` serviceInstanceUID is the unique id for the service instance. This uid must be unique for a userId. The event management platform 120 or 220 will store this value for later use in processing the subscriptions. location (optional) is the location of the service instance within the user's account. Name (optional) is the localized name of the service instance. serviceProtocol (optional) indicates the protocol used for the service (e.g. pop, imap . . . ). retCode attribute contains the return code for the request and message contains the detail string. Message attribute is optional and contains the error-detail. This string is for the consumption of the event management platform 120 or 220 and should not be localized.

The discover message may contain multiple service discovery requests, in an example embodiment. These may be for a single user account or for multiple user accounts.

If there is an error in processing the discovery request such as invalid credentials, incorrectly formatted request, or the like, retCode on the response element contains the error code indicating that the complete request failed and there will not be any discover elements in the response. retCode on the serviceDiscoverResponse element identifies any error for the data in the subscription element. Multiple instances of the discover sub elements may be present in the request and response.

Subscription Request (Event Management Platform→Service Event Source)

According to a further aspect of the present disclosure, there is provided an approach to present to the service event source requests to subscribe to notifications. A subscription request may be used to set up subscriptions on a specific user's service or on a domain, in example embodiments. During the notification setup process for a user, one or more subscription requests can be sent from the event management platform 120 to a service event source 105 indicating that notifications should be sent to the event management platform 120 for certain events related to the associated service.

The service event source 105 can generate subscription-ids that are unique within that user account and respond to the subscription request with the subscription-ids. The subscription request can be sent from the event management platform (such as 120 of FIG. 1 or 220 of FIG. 2) to the service event source (such as 105 of FIG. 1 or 205 of FIG. 2) requesting that a new subscription for notifications be added to the service Instance. A separate subscription request can be sent for each account and service. Multiple subscriptions can be supported for each service on a service event source user account. The subscription request need not identify specific events, but may do so in an example embodiment. It is expected that any and all service events are subscribed including service metadata events.

In an example embodiment according to an aspect of the present disclosure, there can be various types of subscription requests, for example, as described below.

ServiceInstanceSubscribe: This message requests that notifications be sent from the service event source (such as 105 of FIG. 1 or 205 of FIG. 2) to the event management platform (such as 120 of FIG. 1 or 220 of FIG. 2) when data items within the user's service instance change (e.g. new mail).

DomainSubscribe: This message requests that notifications be sent from the service event source (such as 105 of FIG. 1 or 205 of FIG. 2) to the event management platform (such as 120 of FIG. 1 or 220 of FIG. 2) when data associated with the domain has changed. Examples of such changes are when new users are added to the domain or domain status has change (e.g. credentials are soon to expire).

Referring to FIG. 2, a subscription request may be performed by an example embodiment as follows. Event notification subscriber interface 250, sends a subscription request communication to service event source 205. The service event source 205 responds to the subscription request with a response. The response from the service event source 205 contains the subscription ID which uniquely identifies a user's subscription and must be unique for a user. Subscription ID is later used during notification and unsubscribe requests.

In an example embodiment, communications may be conducted as follows:

```
POST <subscription-url> HTTP/1.1
<?xml version="1.0"?>
<request xmlns:s="urn:uuid:0425d6db-060f-4576-
b083-3386ce7bb984:"
        ts="timestamp" >
    <s:subscription>
        <s:serviceInstanceSubscribe
            s:userId="Service event source user id"
            s:serviceInstanceUID="uid of the mailbox"
            s:notifyURL="url"
            s:subscriptionGroup="abc"
            s:subscriptionChannel="xyz"
            s:notifyWindow="30"
            s:notificationBufferInterval="15"
            s:notifyInfo="opaque-data"/>
        <s:domainSubscribe
            s:domainName="somedomain.com"
            s:notifyUrl="url"
            s:subscriptionChannel="xyz"
            s:notifyInfo="opaque-data"/>
    </s:subscription>
</request>
``` userId is the account's user ID.

serviceInstanceUID uniquely identifies the service instance. This corresponds to the serviceInstanceUID attribute returned in the discovery response. Alternatively, this may be determined by the service event source. notifyURL (optional) is the call back URL used by the service event source to send back Push notifications. This may be omitted for Pull notifications. When present, the service event source should immediately initiate transmitting notification events to the notifyURL as they are generated. subscriptionGroup (optional) is an arbitrary group assignment for the subscription. subscriptionChannel (optional) associates this subscription with an instance of a notification channel. These channels may be Pull or Push. notifyWindow (optional) identifies the number of days in the past to allow item notifications. E.g. for example, this attribute may specify notifications for changes made to items within the past 30 days. This attribute is most useful for calendar service types. notificationBufferInterval (optional) is the minimum Interval between notification messages for a single subscription ID. The value is in seconds.

notifyInfo (optional) is a device-specific, opaque data string from the event management platform to be passed back in the notifications. If notifyInfo is present in the subscription request it must be returned in notifications. Opaque data can be defined as data to be used by the event management platform and that is not visible or readable by a service event source. The data may be encoded or encrypted, such as by using Base 64. domainName identifies a domain within the service event source's system. Domain is intended to be a grouping of user accounts within the service event source. It may correspond to an actual domain (e.g. someDomain.com) or it may correspond to some other grouping method (e.g. CompanyA vs CompanyB). notifyURL and/or subscriptionChannel may be present in the message.

In an example embodiment, a response to the subscription request may take the form:

```
HTTP/1.1 200 OK
<?xml version="1.0"?>
<request xmlns:s="urn:uuid:0425d6db-060f-4576-
b083-3386ce7bb984:"
    retCode="returnCode" message="message"/>
    <s:subscription>
        <s:subscribeResponse
            s:subId="subscription-id"
            s:userId="Service event source user id"
            s:serviceInstanceUID="uid of the service instance"
            s:serviceInstanceName="someuserid@domain.com"
            s:notifyinfo="opaque-data"
            s:retCode="returnCode"
            s:message="message"/>
        <s:domainSubscribeResponse
            s:subId="subscription-id"
            s:domainName="someDomain.com"
            s:notifyinfo="opaque-data"
            s:retCode="returnCode"
            s:message="message"/>
    </s:subscription>
</request>
``` subId is the subscription ID that identifies the subscription. The subscription ID must be unique for a userId. The event management platform will store this value for later use in processing the notification or unsubscribing. userId (optional) is the user's authentication id for the service (omitted for domain subscriptions). serviceInstanceUID is the same as that from the request. serviceInstanceName is the service event source specific name for this service instance. notifyInfo (optional) is the opaque data passed in the request. If notifyInfo was present in the subscription request, it must be present in the response. retCode attribute contains the return code for the request and message contains the detail string. Message attribute is optional and contains the error-detail. This string is for the consumption of the event management platform system and should not be localized.

If there is an error in processing the subscription request such as invalid credentials, incorrectly formatted request, etc, retCode on the request element contains the error code indicating that the complete request failed and there will not be any subscription elements in the response. retCode on the subscriptionResponse element identifies any error for the data in the subscription element.

Notification Channel Management

Management of the notification channel may be needed so that the correct notification URL and notifications are associated with the correct notification channel. Management is defined for individual and group subscriptions as well as Pull and Push channels.

Notification Registration Request (Event Management Platform→Service Event Source)

The Notification Registration Request is used to manage the notification channel in aggregate (e.g. start notifications for a channel for pull type notifications, provide a URL for push type notifications). This is in contrast to Subscription request, which is used to set up subscriptions on a specific user's service or on a domain. The notification registration request is used to designate the correct notifyURL for individual and group Push notifications as well as to identify which channel and group notifications are to be transmitted on a given Pull channel.

Notification Registration

The NotificationRegistration request message has slightly different semantics for Push vs Pull channels. In the Push channel model, the channelRegistration and groupRegistration messages notify a service event source (such as 105 of FIG. 1 or 205 of FIG. 2) which URL to send notifications for the channel or group. Upon receipt of these messages from the event management platform (such as 120 of FIG. 1 or 220 of FIG. 2) in a Push model, the service event source should start sending notification events to the designated notifyURL. The HTTPS connection may be closed after the appropriate HTTP response is sent. Since individual subscriptions may contain notifyUrl attributes, this message is used to change that url for an entire subscription channel.

Referring to FIG. 2, a Push channel notification registration request may be performed by an example embodiment as follows. Event notification subscriber interface 250, sends a notification registration request communication to a service event source 205 regarding the url to send notifications for the channel or group.

In the Pull channel model, the channelRegistration and groupRegistration elements notify the a service event source (such as 105 of FIG. 1 or 205 of FIG. 2) which channel and group notifications are to be transmitted on the current open HTTPS connection. Upon receipt of this message from the event management platform (such as 120 of FIG. 1 or 220 of FIG. 2) in the Pull case, the service event source should start sending notification events for the specified channel or group over the current, open HTTPs connection. In the Pull model, the notifyURL will be absent.

Referring to FIG. 2, a Pull channel notification registration request may be performed by an example embodiment as follows. Event notification consumer interface 280, sends a notification registration request communication to event manager 270. The event manager 270 then sends a communication to a service event source 205 regarding specified channel or group over the current, open HTTPS connection.

In an example embodiment communications may be conducted as follows:

```
<s:notificationRegistration>
    <s:channelRegistrationAdd
        s:subscriptionChannel="xyz"
        s:notifyUrl="abc "/>
    <s:channelRegistrationDelete
        s:subscriptionChannel="xyz"/>
    <s:channelRegistrationUpdate
        s:subscriptionChannel="xyz"
        s:notifyUrl="abc "
        s:suspend="0"/>
    <s:groupRegistrationAdd
        s:subscriptionGroup="abc"
        s:notifyUrl="abc"/>
    <s:groupRegistrationDelete
        s:subscriptionGroup="abc"/>
    <s:groupRegistrationUpdate
        s:subscriptionGroup="abc"
        s:notifyUrl="abc"
        s:suspend="0"/>
    <s:domainRegistrationAdd
        s:domainName="abc"
    <s:domainRegistrationDelete
        s:domainName="abc"
```

-continued

```
    <s:domainRegistrationUpdate
        s:domainName="abc"
        s:suspend="0"/>
</s:notificationRegistration>
``` suspend:(optional) This attribute is used to temporarily suspend (value "1") or reactivate (value "0") notifications for a channel or group.

Notification Registration Response

The response to the notificationRegistration request also has somewhat different semantics depending on the channel model. In the Push channel model, the correct response to the notificationRegistration request is an HTTP response containing a channel and/or group registration response element. These elements indicate the success or failure of the registration request. The channel is closed after the response is sent.

In the Pull channel model, the channel and/or group registration response is returned in an HTTP response. If the request was globally in error, the connection is then closed. If the request fully or partially succeeded, the connection is held open and notification messages are forwarded from the service event source to the event management platform.

In an example embodiment communications may be conducted as follows:

```
<s:notificationRegistrationResponse>
    <s:channelRegistrationResponse
        s:subscriptionChannel="xyz"
        s:subId="subId"
        s:retCode="returnCode"
        s:message="message"/>
    <s:groupRegistrationResponse
        s:subscriptionGroup="xyz"
        s:subId="subId"
        s:retCode="returnCode"
        s:message="message"/>
    <s:domainRegistrationResponse
        s:domainName="xyz"
        s:subId="subId"
        s:retCode="returnCode"
        s:message="message"/>
</s:notificationRegistrationResponse>
```

Notification (Service Event Source→Event Management Platform)

According to a further aspect of the present disclosure, there is provided an approach to present to the event management platform a notification request indicating that an event has occurred. A service event source 105 can generate a notification request to the event management platform 120 when any of the events occur for the users' subscribed service instances.

The notification request is sent to the event management platform (such as 120 of FIG. 1 or 220 of FIG. 2) whenever a subscribed event occurs on a user's account for the associated service instance. Multiple events may be combined in a single message, grouped by subscription ID. The maximum number of events per notification may be set to a predetermined number, in an example embodiment such as 100. The maximum size of a single notification request may also be set to a predetermined number, in an example embodiment. An error may be returned if either of these limits is violated.

In an example embodiment, the description of the event may include data changes and other information related to the event such as the type of event triggering the notification, a list of data items associated with the event, the name of an item's data element associated with this event (e.g. readStatus), data associated with the event. E.g. 10 for readStatusChange events. Providing such a description of the event is useful because it can eliminate the need to query the service event source 205 for data changes related to the event.) In the Push model, this message is in the form of a HTTP request using the POST method. In the Pull model, this message is a response to a notificationRegistration request.

In an example embodiment, a high water mark (or synchronization anchor or value) may be included in the notification message from the service event source 205. Upon receipt of the notification message from the service event source, the event manager 270 can store the high water mark value in database 290 (with an association to the service instance to which the high water mark value corresponds). In an example embodiment, the high water mark is a value that is incremented by the service event source upon an event for a particular service instance (such as for example a single user's single email account). For example, upon sending a notification message to the event manager about an event of a new email received at the service event source, the high water mark is incremented in the notification message. The event manager can compare the high water mark value in the recent notification message with the high water mark value currently stored at database associated with the service instance.

If the values are different, the event manager can retrieve data from the service event source by requesting that the service event source send any data associated with events associated with notifications having high water mark values in between the high water mark value in the recent notification message with the high water mark value currently stored at the database. The high water mark is useful for synchronization based services, such that high water mark changes in a notification can trigger a synchronization between the event management platform and an event source. This is in contrast to polling the service for changes periodically.

In an example embodiment, communications may be conducted as follows:

```
<n:request xmlns:n="urn:uuid:0425d6db-060f-
4576-b083-3386ce7bb984:"
        ts="timestamp" >
    <s:notification
        subId="subid"
        notifyInfo="opaque-data">
    <s:serviceNotification
        S:eventType="serviceInstanceUpdate"
        <s:eventData
            s:eventField="userID"
            s:eventValue="12de33cf3990"/>
        S:highWaterMark="hwm"/>
    <s:itemNotification
        s:serviceItemUID=""
        s:serviceItemService event source
UID=""
        s:eventType="update"
        <s:eventData
            s:eventField="userID"
            s:eventValue="12de33cf3990"/>
    <s:categoryNotification
        s:serviceInstanceUID="abc"
        s:categoryEvent="abc"
        s:categoryName="xyz"
        s:normalizedCategoryName="abc"
        s:categoryName2="abc"
        s:normalizedCategoryName2="mno/>
```

-continued

```
<s:groupNotification
    S:subscriptionGroup
    S:eventType
    <s:eventData
        s:eventField="userID"
        s:eventValue="12de33cf3990"/>
<s:domainNotification
    s:eventType="add"
    <s:eventData
        s:eventField="userID"
        s:eventValue="12de33cf3990"/>
</s:notification>
``` subId is the subscription-Id generated on a subscription request. notifyinfo must be unaltered from the subscription request. eventType: is the type of event triggering the notification. eventData: is optional and if present contains a list of data items associated with the event. eventField: is the name of a item's data element associated with this event (e.g. readStatus). eventValue: is data associated with the event. E.g. 10 for readStatusChange events. highWaterMark: is optional and if present contains the current "high water mark" for the service instance store. serviceItemUID: is a unique identifier for the service item (e.g. imap message id). serviceItemService event source UID: is optional and if present is a unique identifier for the service item used by the service event source.

categoryEvent: is an event associated with categories (categoryCreate, categoryRemove, categoryRename).

categoryName: is a category name (may be localized by the service event source) (e.g. myInbox).

normalizedCategoryName: is a non-localized category name not specific to the user (e.g. Inbox). categoryName2: is a category name (in rename events use categoryName for the old name and categoryName2 for the new name).

subscriptionGroup: is the subscription group associated with the subscription.

Note: Domain events may indicate changes to the users associated with the domain (e.g. add, update, delete) or changes to metadata associated with the domain (e.g. credentials expiring, service status changing). In an example embodiment, the response may take the form:

HTTP/1.1 200 OK.

Unsubscribe Request (Event Management Platform→Service Event Source)

According to a further aspect of the present disclosure, there is provided an approach to present to the service event source a request to "unsubscribe" to notifications. When the notifications on a user account are no longer desired for a service instance (e.g. the account is removed), an unsubscribe request can be sent from the event management platform 120 to a service event source 105 with the id of the subscription that should be deleted. For various reasons, the event management platform (such as 120 of FIG. 1 or 220 of FIG. 2) may no longer require notifications from a service event source (such as 105 of FIG. 1 or 205 of FIG. 2) for a user's subscription.

Referring to FIG. 2, an unsubscribe request may be performed by an example embodiment as follows. Event notification subscriber interface 250, sends an unsubscribe request communication to a service event source 205. The service event source 205 responds to the unsubscribe request with an acknowledgement. In an example embodiment, an unsubscribe message with the following form can be sent to terminate notifications:

```
POST <subscription-url> HTTP/1.1
<?xml version="1.0"?>
<request xmlns:s="urn:uuid:0425d6db-060f-4576-
b083-3386ce7bb984:"
        ts="timestamp" >
    <s:subscription>
        <s:unsubscribeRequest
s:subId="subscription-id"/>
    </s:subscription>
<request>
``` subId identifies the subscription ID to be removed and corresponds to the value returned from the original subscription call to the service event source.

In an example embodiment, a response may take the form:

```
HTTP/1.1 200 OK
<?xml version="1.0"?>
<s:response xmlns:s=" urn:uuid:0425d6db-060f-
4576-b083-3386ce7bb984:" ver="0.1"
        retCode="returnCode" message="message">
    <s:subscription>
        <s:unsubscribeResponse
            s:subId="subscription-id"
            s:retCode="returnCode"
            s:message="message"/>
    </s:subscription>
</s:response>
```

Get Information Request (Event Management Platform→ Service Event Source)

According to a further aspect of the present disclosure, there is provided an approach to present to the service event source a "get information" request seeking information regarding the subscriptions of a user. The event management platform 120 may send the service event source 105 a request for the current subscription status for a user. The service event source 105 will respond with a list of subscriptions and corresponding data. The Get Information Request message is a request from the event management platform (such as 120 of FIG. 1 or 220 of FIG. 2) to the service event source (such as 105 of FIG. 1 or 205 of FIG. 2) for all of the current subscription definitions associated with a userId.

Referring to FIG. 2, a get information request may be performed by an example embodiment as follows. Event notification subscriber interface 250 sends a get information request communication to service event source 205. The service event source 205 responds to the get information request with a response containing the information requested.

In an example embodiment communications may be conducted as follows:

```
POST < subscription-url > HTTP/1.1
<?xml version="1.0"?>
<s:request xmlns:s="urn:uuid:0425d6db-060f-
4576-b083-3386ce7bb984:"
        ts="timestamp" >
    <s:getInfoRequest>
        <s:getUserInfo
            s:userId="userid"
            s:serviceType="contacts"/>
    </s:getInfoRequest>
</s:request>
``` userId is the user's id within the service event source (e.g. email address). serviceType indicates the type of service for which data is requested.

In an example embodiment, a response may take the form:

```
HTTP/1.1 200 OK
<?xml version="1.0"?>
<request xmlns:s="urn:uuid:0425d6db-060f-4576-
b083-3386ce7bb984:" >
    <s:getInfoResponse>
        <s:userInfo s:userId="userId">
            <s:subscriptionInfo
                s:subId="subscription-id"
                s:serviceType="abc"
    s:subscriptionChannel="subscription channel"
                s:suspended="1"
    s:subscriptionHighWaterMark="123"
                s:notifyUrl="notify Url"
                s:notifyInfo="opaque-data"/>
        </s:userInfo>
    </s:getInfoResponse>
</request >
``` subId is the subscriptionId that identifies the subscription. serviceType (optional in the request) indicates the instance's service type. When absent in the request, all subscriptions for all services associated with the user should be returned. Suspended indicates whether or not the subscription is currently suspended. "0" indicates not suspended (active), "1" indicates suspended. subscriptionHighWaterMark (optional) indicates the current max change ID for this service instance, and may, for example, be a "sync anchor". notifyUrl (optional) is the URL to which the service event source will send the subscribed notifications. NotifyUrl is provided by the event management platform in the subscription request. notifyInfo (optional) is the opaque data provided by the event management platform in the subscription request.

Error Handling

In example embodiments, the following Subscription/Notification Error Handling codes may be used to indicate an error as adjacently described.

Subscribe, Unsubscribe, GetInfo and SuspendSubSubscription Error Codes:
 0 OK, no error
 1001 Required parameters are missing.
 1002 reserved.
 1003 reserved.
 1004 Timestamp (ts) falls outside acceptable interval.
 1005 Invalid message format. (xml document error)
 1010 Version number in the request is not supported
 1099 Unexpected system error while processing the request.
Subscription-Specific Error Return Codes:
 1101 reserved.
 1102 Invalid User authentication.
 1103 No mail box
 1104 Duplicate subscription for account that is already subscribed
 1105 reserved
 1106 Maximum number of subscriptions exceeded
 1199 Unexpected Subscription Error
Notification Response HTTP Error Codes:
 http/1.1 400 BAD REQUEST, the request was somehow malformed; HTTP/1.1 401 UNAUTHORIZED, no credentials were presented or the credentials presented are invalid; HTTP/1.1 403 FORBIDDEN, the operation was refused; HTTP/1.1 413 REQUEST_ENTITY_TOO_LARGE, the notification message was too large or the number of events or notifications exceeded the maximum.

Regarding subscription error handling, in an example embodiment, on both HTTP and application error conditions during subscriptions, the event management platform 120 may retry the subscription request after a predetermined amount of time, in an example embodiment, such as 15 minutes. The delay between retries may be important since it prevents any denial of service side effect. Subscription Deletions: the event management platform 120 will retry the 'unsubscribe' request when a notification arrives for a subscription that has been deleted earlier. Also the return code for the notification should indicate account not subscribed.

In accord with a further aspect of the present disclosure, a service consumer (such as 140 of FIG. 1 or 240 of FIG. 2), may, for example but without limitation, take the form of an application, service, program, or the like, running or resident, in whole or in part, on a mobile wireless communications device. By way of example but not limitation, the service consumer could be an e-mail client, a calendar client, any other Personal Information Management program, or any other program or service that may benefit from the event notifications managed by event management platform 120.

Figure 5:
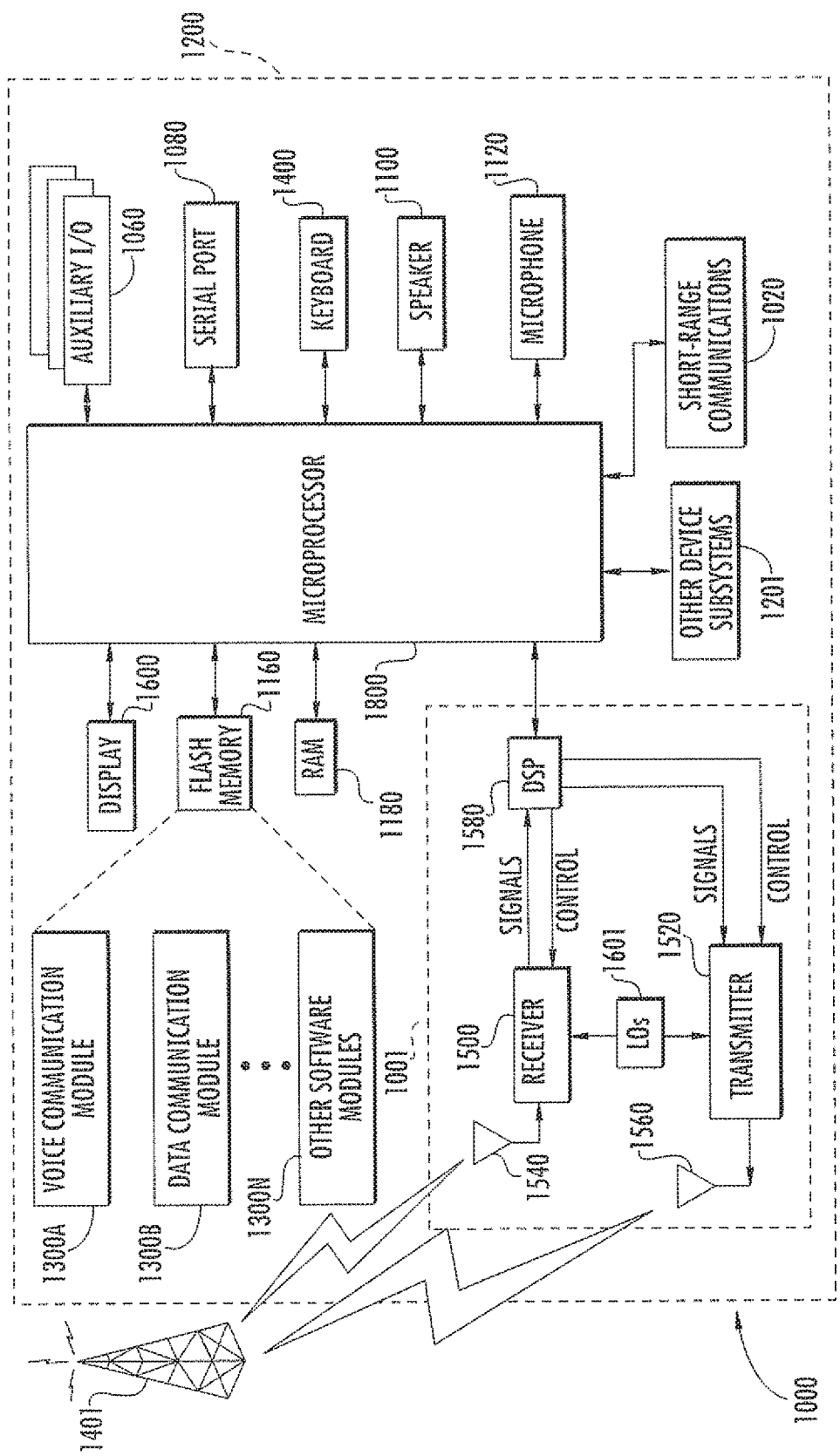
FIG. 5 is a schematic diagram illustrating a mobile wireless communications device for use with the event management network.

An example embodiment of a suitable mobile wireless communications device 1000 is depicted in FIG. 5, but as will be appreciated by those of skill in the art, other configurations of mobile wireless communications device could also be used to host or support a service consumer 140. Furthermore, the wireless communication device may be a pager, cellular phone, cellular smart-phone, wireless organizer, personal digital assistant, computer, laptop, handheld wireless communication device, wirelessly enabled notebook computers and the like.

As best seen in FIG. 5, device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as email, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system. The PIM application is an example of a service consumer 140 that may receive data related to event notifications from event management platform 120. Other of applications 1300A-1300N could also be service consumers that receive may receive data related to event notifications.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice or hybrid voice-and-data communications networks, such as AMPS, TDMA, CDMA, WCDMA, PCS, GSM, EDGE, IDEN, and the like. Other types of data and voice networks, both separate and integrated, may also be utilized with the mobile device 1000 and its communications subsystem 1001. The mobile device 1000 and its communications subsystem may also be compliant with other communications and networking standards such as 3GSM, 3G, UMTS, 4G, LTE, WiFi, WiMAX, UMA, and the like.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network. Other appropriate network access methods may also be used.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion.

Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Figure 7A:
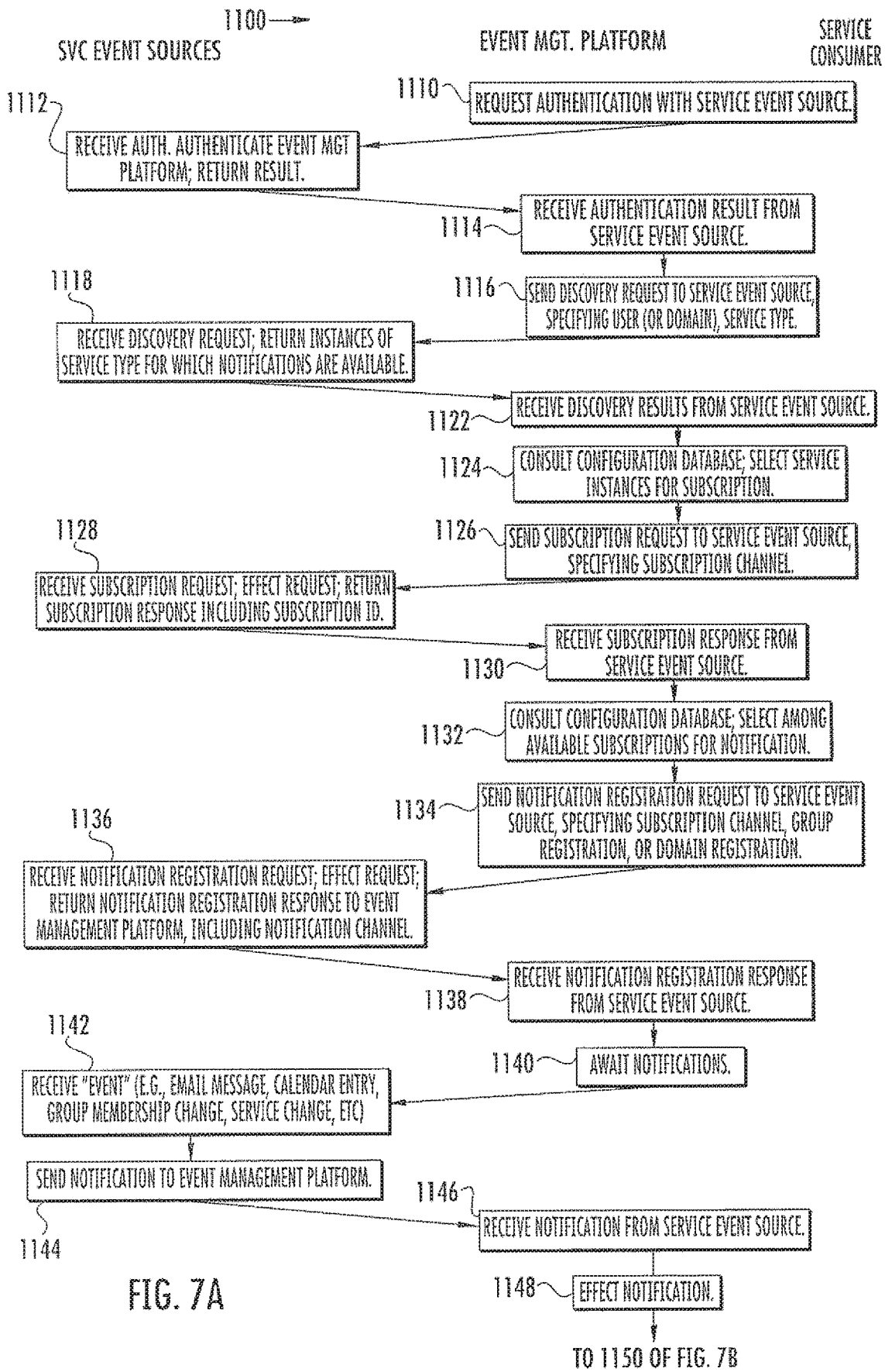
FIGS. 7A and 7B are flowcharts illustrating example embodiments or portions thereof of communication management methods.
Figure 7B:
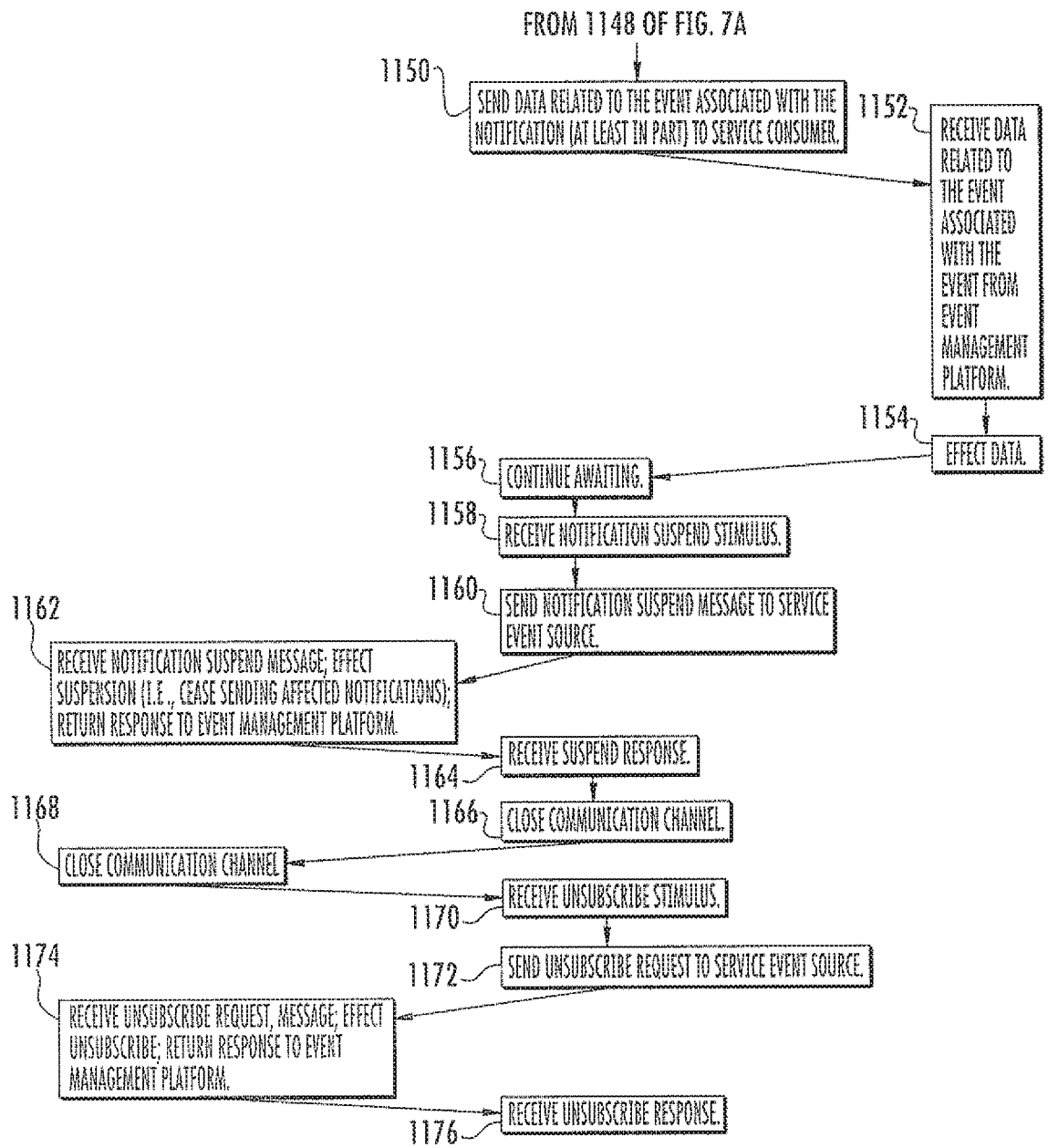

FIGS. 7A and 7B, illustrate methods 1100 which may be performed by a service event source (such as 105 of FIG. 1 or 205 of FIG. 2), an event management platform (such as 120 of FIG. 1 or 220 of FIG. 2) and a service consumer (such as 140 of FIG. 1 or 240 of FIG. 2) according to an example embodiment.

At 1110, the event management platform sends a request authentication with the service event source. At 1112, the service event source receives authorization and then authenticates with and returns an authentication result to the event management platform. At 1114, the event management platform receives the authentication result from the service event source.

At 1116, the event management platform sends a discovery request to the service event source, specifying user (or domain), service type. At 1118, the service event source receives discovery request and returns instances of service type for which notifications are available.

At 1122, the event management platform receives the discovery results from the service event source. At 1124, the event management platform consults configuration database and selects the service instances for subscription.

At 1126, the event management platform sends a subscription request to the service event source, specifying subscription channel. At 1128, the service event source receives the subscription request, effects the request, and returns a subscription response including a subscription ID. At 1130, the event management platform receives the subscription response from the service event source. At 1132, the event management platform consults with the configuration database and selects among available subscriptions for notification.

At 1134, the event management platform sends a notification registration request to the service event source, specifying subscription channel, group registration, or domain registration. At 1136, the service event source receives the notification registration request, effects the request and returns a notification registration response to the event management platform, the response including a notification channel. At 1138, the event management platform receives the notification registration response from the service event source. At 1140, the event management platform awaits notifications.

At 1142, the service event source receives an event (e.g., email message, calendar entry, group membership change, service change, etc.) At 1144, the service event source sends a notification to the event management platform. At 1146, the event management platform receives a notification from the service event source. At 1148, the event management platform effects notification.

FIG. 7B continues the flow diagram of FIG. 7A. At 1150, the event management platform delivers data related to the event associated with the notification (at least in part) to the service consumer. At 1152, service consumer receives data related to the event associated with the notification from event management platform. At 1154, service consumer effects the data. At 1156, the event management platform continues waiting for events.

Steps 1158-1064, are directed to temporarily suspending a notification registration. These steps are principally applicable to a push notification scenario. When pull notification is used, it may be unnecessary to suspend notification, as the notification channel could be closed instead (see steps 1166-1168). At 1158, the event management platform receive notification suspend stimulus.

At 1160 the event management platform sends a notification suspend message to the Service Event Source. At 1162, the service event source receives the notification suspend request message, effects suspension (i.e., ceases sending affected notifications), and returns a response to the event management platform. At 1164, the event management platform receives the suspend response.

Steps 1166 and 1168 may apply to a pull notification scenario. At 1166, the event management platform closes communication channel. Alternatively, at 1168, the service event source closes communication channel. Either may close the channel due to close stimulus.

At 1170, the event management platform receives an unsubscribe stimulus. At 1172, the event management platform sends an unsubscribe request to the service event source. At 1174, the service event source receives the unsubscribe request message, effects the unsubscribe, and returns a response to event management platform. At 1174, the event management platform receives the unsubscribe response.

The steps or operations in the flow diagrams described herein are just for example. There may be many variations to these steps or operations without departing from the spirit of the invention. For instance, the steps may be performed in a differing order, or steps may be added, deleted, or modified.

The present application relates to electronic communications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the communications system arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A communications method comprising:
at an event management platform in communication with a plurality of mobile wireless devices associated with a plurality of users over a wireless communications network, generating a discovery request identifying a user of the plurality of users and corresponding to at least one service type;
the event management platform sending the discovery request to a subscription interface address of a service event source;
the event management platform receiving a response from the service event source identifying a plurality of instances of the at least one service type associated with the identified user;
the event management platform selecting at least one instance from the plurality of instances of the at least one service type;
the event management platform sending a further request in respect of the selected at least one instance of the at least one service type to the service event source over a communication channel between the service event source and the event management platform, the further request comprising a notification address for receiving notifications; the event management platform maintaining the communication channel open to receive notifications transmitted from the service event source resulting from the further request; and
the event management platform providing the notifications to the at least one mobile wireless device.

2. The method of claim 1, wherein the service event source comprises an email server.

3. The method of claim 2, wherein the one or more instances each comprises a mailbox at the service event source.

4. A system, comprising:
an event management platform server comprising at least one processor and communications system, the event management platform being connected to a plurality of mobile wireless devices associated with a plurality of users over a wireless communications network and being configured to:
generate a discovery request identifying a user of the plurality of users and corresponding to at least one service type;
send the discovery request to a subscription interface address of a service event source;
receive a response from the service event source identifying a plurality of instances of the at least one service type associated with the identified user;
select at least one of the plurality of instances of the at least one service type;
transmit a further request to the service event source in respect of the selected at least one instance of the at least one service type over a communication channel between the service event source and the event management platform server, the further request comprising a notification address for receiving notifications;
maintain the communication channel open to receive notifications transmitted from the service event source resulting from the further request; and
provide the notifications to the at least one mobile wireless device.

5. The system of claim 4, wherein the service event source comprises an email server.

6. The system of claim 5, wherein the one or more instances each comprises a mailbox at the service event source.

7. A non-transitory computer-readable medium bearing code which, when executed by at least one processor of a computer system in an event management platform in communication with a plurality of mobile wireless devices associated with a plurality of users over a wireless communications network, causes the system to implement:
the event management platform generating a discovery request to a service event source, the discovery request identifying a user of the plurality of users and corresponding to at least one service type;
the event management platform sending the discovery request to a subscription interface address of a service event source;
the event management platform receiving a response from the service event source identifying a plurality of instances of the at least one service type associated with the identified user;
the event management platform selecting at least one instance from the plurality of instances of the at least one service type;
the event management platform sending a further request in respect of the selected at least one instance of the at least one service type to the service event source over a communication channel between the service event source and the event management platform, the further request comprising a notification address for receiving notifications; the event management platform maintaining the communication channel open to receive notifications transmitted from the service event source resulting from the further request; and
providing the notifications to the at least one mobile wireless device.

8. The non-transitory computer-readable medium of claim 7, wherein the one or more instances each comprises a mailbox at the service event source.

9. The method of claim 1, wherein the service event source comprises a social networking service.

10. The method of claim 1, wherein the service event source comprises an information feed service.

11. The method of claim 1, further comprising:
the event management platform transmitting, to the service event source, an instruction to suspend notifications.

12. The system of claim 4, wherein the service event source comprises a social networking service.

13. The system of claim 4, wherein the service event source comprises an information feed service.

14. The system of claim 4, wherein the event management platform is further configured to transmit, to the service event source, an instruction to suspend notifications.

15. The non-transitory computer-readable medium of claim 7, wherein the service event source comprises a social networking service.

16. The non-transitory computer-readable medium of claim 7, wherein the service event source comprises an information feed service.

17. The non-transitory computer-readable medium of claim 7, further comprising code which, when executed by at least one processor of a computer system in an event management platform in communication with a plurality of mobile wireless devices associated with a plurality of users over a wireless communications network, causes the event management platform to transmit to the service event source an instruction to suspend notifications.

* * * * *